June 26, 1956 R. L. FOWLER 2,751,755
PRESSURE TANK
Filed May 14, 1954
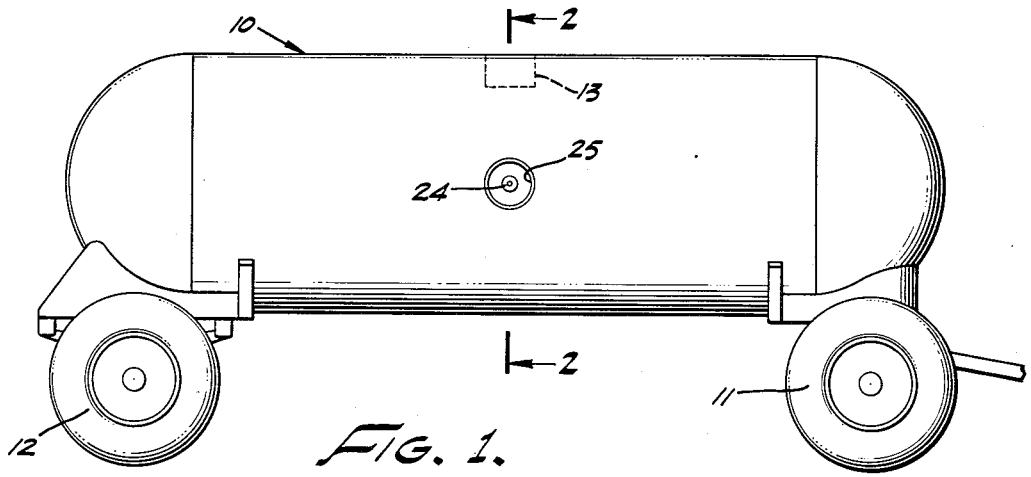
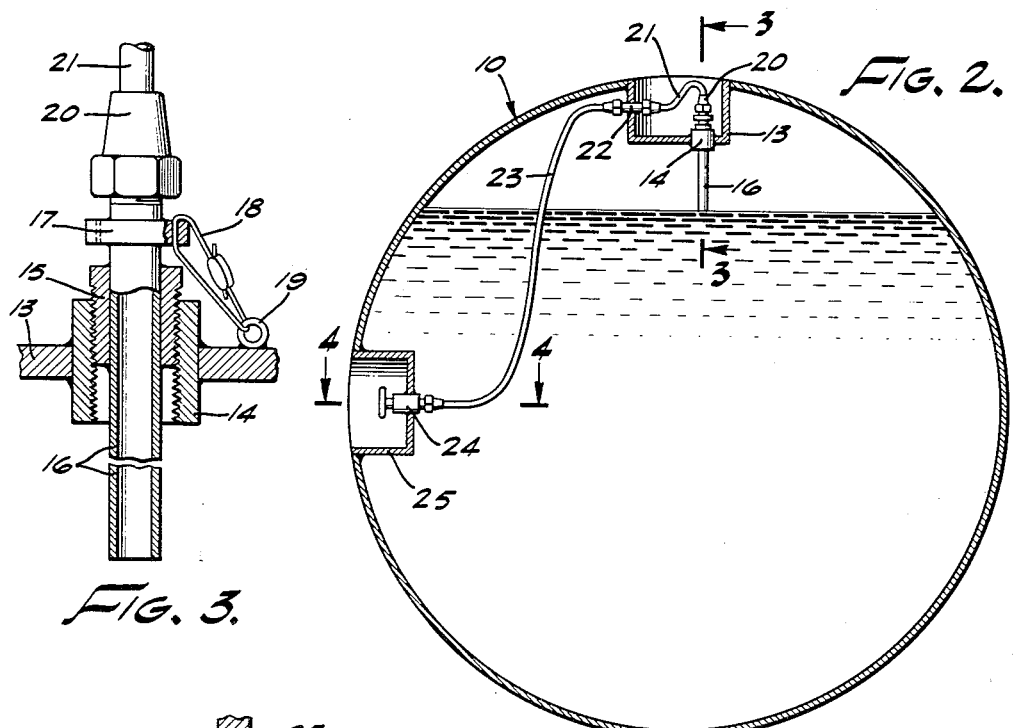
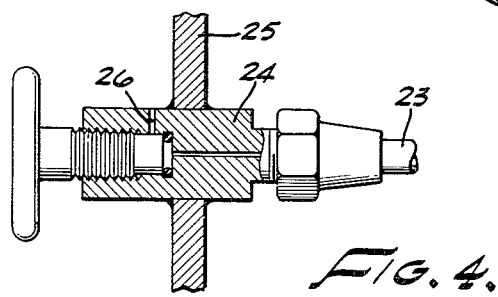
INVENTOR.
RALPH L. FOWLER
BY Hazard & Miller
ATTORNEYS

United States Patent Office 2,751,755
Patented June 26, 1956

2,751,755

PRESSURE TANK

Ralph L. Fowler, Los Angeles, Calif., assignor to Superior Tank & Construction Co., Los Angeles, Calif., a corporation of California Application May 14, 1954, Serial No. 429,960

2 Claims. (Cl. 62—1)

This invention relates to a pressure tank. It is particularly adaptable to that type of pressure tank used in the storage and transportation of liquefied gases but may be used in tanks containing other liquids, either maintained under pressure or in which pressure is supplied to the tank.

In pressure tanks of the type heretofore constructed for the storage or transportation of liquefied petroleum gases and anhydrous ammonia, and the like, an "outage" tube has generally been mounted on top of the tank and extends downwardly therein at a definite distance so that the lower end of the tube terminates at a definite level within the tank. These outage tubes are cut so that they will terminate at this predetermined level and are given a final minute adjustment at which position they are sealed in place. The level at which the lower end of the outage tube terminates is intended to be that level to which the tank may be filled with liquid. That space that is present in the tank above the mentioned level constitutes a vapor space within which vapors developed from the liquid are retained under pressure.

Heretofore such outage tubes have been equipped with bleeder valves located at their upper ends and which are consequently located at the top of the tank. In the course of filling a tank, liquid is pumped into the tank and the bleeder valve is opened. Gas is allowed to escape through the bleeder valve until such time as the level of liquid reaches the bottom of the outage tube. When this occurs liquid is forced up through the outage tube by the pressure existing within the tank and escapes through the bleeder valve. The discharge of liquid through the bleeder valve indicates that the predetermined level to which the tank may be filled with liquid has been reached and filling of the tank is then discontinued. These outage tubes are thus used to accurately determine that a proper vapor space has been preserved in the top of the tank and to accurately indicate the liquid load in the tank with respect to its volumetric capacity.

When the bleeder valve is located at the top of the outage tube it is highly inconvenient to climb to the top of the tank and observe the instant at which liquid starts to be discharged through the bleeder valve and filling of the tank should consequently be discontinued.

An object of the present invention is to provide an improved tank of this character wherein the outage tube is mounted in the bottom of a recess provided in the top of the tank and extends downwardly into the tank through the bottom wall of the recess. However, instead of locating the bleeder valve at the top of the outage tube the bleeder valve is located in another recess formed in the side wall of the tank. Consequently, the bleeder valve is conveniently located and can be readily observed at all times to determine the instant at which liquid starts to be discharged through the bleeder valve. The connection between the outage tube and the bleeder valve is disposed entirely within the general contour of the tank so that in this manner the outage tube is not only protected and the bleeder valve is also protected but the connection between the outage tube and the bleeder valve are also protected.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of a pressure tank embodying the present invention mounted upon or forming a part of the construction of a tank trailer;

Fig. 2 is a vertical section taken substantially upon the line 2—2 upon Fig. 1;

Fig. 3 is a vertical section taken substantially upon the line 3—3 upon Fig. 2; and Fig. 4 is a sectional view taken substantially upon the line 4—4 upon Fig. 2.

Referring to the accompanying drawings wherein similar reference characters designate similar parts throughout, 10 indicates generally a pressure tank which may be of any conventional or preferred design. I have illustrated such tank as being mounted on front and rear wheels 11 and 12, respectively, so as to constitute a tank trailer. It will be understood, however, that the tank 10 may be mounted on any other convenient means of transportation if so desired.

In the top of the tank there is formed a recess 13 in the bottom of which there is welded or otherwise secured an internally threaded nipple 14. In this nipple there is an externally threaded bushing 15 through which the outage tube 16 extends and which is welded or otherwise secured therein. The outage tube has an annular flange 17 thereon in which there are apertures through which a seal 18 can be extended, this seal passing through an eye or the equivalent indicated at 19 which is secured to the bottom of the recess 13. The length of the outage tube 16 is cut so that its lower end terminates at a predetermined level in the tank such level being that to which the tank can be filled with liquid. The threaded connection between the bushing 15 and the nipple 14 permits of a fine adjustment of the outage tube so that its lower end will properly terminate at the desired level and when this position has been ascertained, the tube is sealed in position by means of the seal 18. The upper end of the outage tube is threaded for attachment of a coupling 20 and metallic tubing 21 connects the coupling to a nipple 22 that extends through a side wall of the recess 13. Tubing 23 is connected by couplings to the nipple 22 and to a bleeder valve 24. The bleeder valve 24 is mounted in the bottom or back of a recess 25 in the side wall of the tank. This bleeder valve is normally closed but when opened permits the escape of fluid through a lateral outlet 26.

It will be noted that the tubing 21, the nipple 22, the tubing 23 and the bleeder valve 24 are all located within the general contour of the tank so that all of these parts are effectively protected against damage. In the course of filling the tank the liquid level gradually rises until it reaches the bottom of the outage tube 16 at which time liquid will be forced upwardly through the outage tube and through the tubings 21 and 23 to the bleeder valve located on the side of the tank. Such liquid as escapes through the outlet 26 indicates that the tank has been filled to the level determined by the bottom of the outage tube and further filling of the tank is then immediately discontinued.

By having the bleeder valve located on the side of the tank it is readily available at all times, thus avoiding the necessity of climbing onto the top of the tank to open and close the bleeder valve and to inspect it for the purpose of determining when liquid starts to be discharged from the outlet 26.

From the above-described construction it will be appreciated that an improved pressure tank has been provided wherein the bleeder valve is advantageously located and all connections between the bleeder valve and the outage tube are adequately protected. In pressure tanks of this character there are usually other fittings and indicators conveniently present. These have not been illustrated upon the drawing inasmuch as their presence or absence does not contribute to or detract from the advantages of the present invention.

Where the liquid is in the nature of a liquefied petroleum gas or liquefied anhydrous ammonia, or similar highly volatile substance, the evaporation of the liquid generates its own vapor and its own pressure within the tank. The invention, however, is not necessarily restricted to a tank designed to contain such substance but may be used on tanks containing other liquids, wherein pressure is supplied to the tank in the form of air pressure or a compressed inert gas.

While the invention has been disclosed as applied to a trailer tank used in the transportation of such liquids, it will be appreciated that it is equally applicable to storage tanks, and the like.

Various changes may be made in the details of construction without departing from the spirit of the invention as defined by the appended claims.

I claim:

1. A pressure tank having a recess in the top wall thereof and an adjustable outage tube extending downwardly into the tank through the bottom of the recess, a seal locking the outage tube in adjusted position, there being a recess in the side wall of the tank, a bleeder valve mounted on the back wall of the recess in the side wall and disposed wholly within the recess, and means forming a conduit connecting the upper end of the outage tube in the top recess through a side wall in the top recess and through the interior of the tank to the bleeder valve.

2. A pressure tank having a recess in the top wall thereof and a recess in the side wall thereof, an outage tube extending downwardly into the tank through the bottom of the top recess, means movably mounting the outage tube in the wall of the top recess, a bleeder valve in the side recess, means forming a conduit disposed within the tank connecting the bleeder valve with a wall of the top recess, and a conduit disposed within the top recess connecting the mentioned conduit with the top of the outage tube.

References Cited in the file of this patent

UNITED STATES PATENTS

| | | |
|---|---|---|
| 2,386,958 | Jackson | Oct. 16, 1945 |
| 2,440,230 | Buttner | Apr. 20, 1948 |
| 2,499,409 | Norway | Mar. 7, 1950 |
| 2,513,181 | Kilham | June 27, 1950 |
| 2,565,872 | Melsheimer | Aug. 28, 1951 |